United States Patent
Majernik et al.

(10) Patent No.: US 7,302,754 B2
(45) Date of Patent: Dec. 4, 2007

(54) HORIZONTAL ASSEMBLY OF STATOR CORE USING A CENTRAL RAIL STRUCTURE

(75) Inventors: Tom Majernik, Pittsburgh, PA (US);
James Bauer, Gibsonia, PA (US);
George F. Dailey, Pittsburgh, PA (US);
Barry Sargeant, Oviedo, FL (US)

(73) Assignee: Siemens Power Generation, Inc., Orlando, FL (US)

( * ) Notice: Subject to any disclaimer, the term of this patent is extended or adjusted under 35 U.S.C. 154(b) by 464 days.

(21) Appl. No.: 11/031,801

(22) Filed: Jan. 7, 2005

(65) Prior Publication Data

US 2005/0236926 A1  Oct. 27, 2005

Related U.S. Application Data

(60) Provisional application No. 60/565,307, filed on Apr. 26, 2004.

(51) Int. Cl.
*B23P 19/00* (2006.01)
*H05K 13/04* (2006.01)

(52) U.S. Cl. .................. 29/729; 29/592.1; 29/596; 29/598; 29/738; 83/29; 83/35; 83/220; 83/257; 310/42; 310/259

(58) Field of Classification Search .............. 29/592.1, 29/596, 598, 729, 738; 83/29, 35, 36, 50, 83/220, 257; 310/180, 184, 216, 254, 263, 310/42, 259

See application file for complete search history.

(56) References Cited

U.S. PATENT DOCUMENTS

| | | | |
|---|---|---|---|
| 3,940,648 A | 2/1976 | Wielt et al. | |
| 4,318,218 A | * 3/1982 | Nelson | .......................... 29/596 |
| 4,425,523 A | 1/1984 | Detinko et al. | |
| 4,473,764 A | * 9/1984 | White | .......................... 310/91 |
| 4,536,671 A | 8/1985 | Miller | |
| 4,587,722 A | * 5/1986 | Miller | .......................... 29/596 |
| 4,916,803 A | 4/1990 | Estrada | |
| 5,136,195 A | 8/1992 | Allen, III et al. | |
| 5,875,540 A | 3/1999 | Sargeant et al. | |
| 6,104,116 A | 8/2000 | Fuller et al. | |
| 6,346,760 B1 | 2/2002 | Boardman, IV | |
| 6,448,686 B1 | 9/2002 | Dawson et al. | |
| 6,548,928 B2 | 4/2003 | Walko et al. | |
| 2002/0070629 A1 | 6/2002 | Dawson et al. | |
| 2002/0070631 A1 | 6/2002 | Dawson et al. | |

FOREIGN PATENT DOCUMENTS

JP   06038418 A  *  2/1994

* cited by examiner

*Primary Examiner*—Paul D. Kim

(57) ABSTRACT

The present invention provides for a method and apparatus of horizontally stacking a stator core. A central rail structure 34 that runs down approximately the center axis of the stator frame 2, and attached to the central rail structure are adjustable supports 40 that hold the central rail structure within the stator frame. A dolly 36 is positioned on top of the central rail structure 34. The dolly 36 has multiple finger supports 38 disposed on its top and the finger supports match corresponding grooves in stator core laminations 10. Lamination are placed onto the dolly, gaps in the lamination engage the finger supports on the upper inner diameter of the lamination. This allows for the lamination to be horizontally moved into place within the stator frame.

11 Claims, 5 Drawing Sheets

HORIZONTAL ASSEMBLY OF STATOR CORE USING A CENTRAL RAIL STRUCTURE

CROSS-REFERENCE TO RELATED APPLICATIONS

This invention claims priority to U.S. Provisional application 60/565,307 filed on Apr. 26, 2004 entitled Methods and Apparatuses for Assembling Generator Stator Cores, which is incorporated herein by reference. This invention is further related to U.S. applications: Apparatus and Method for the Installation of a Pre-Assembled Stator Core, by Allen, et al.; Method and Apparatus of the Mounting of and Circumferential Displacement of Radial Forces in a Stator Core Assembly, by Sargeant et al.; Horizontal Assembly of Stator Core using Keybar Extensions, by Sargeant et al.; all filed herewith and all incorporated herein by reference.

FIELD OF THE INVENTION

The present invention relates to power generators, and more specifically stator cores. More particularly, the invention relates to the horizontal assembly of a stator core using a central rail structure that supports laminations and donuts from the upper-inner diameter for placement within the stator frame.

BACKGROUND

The generator stator core is the largest component in the train of a turbine generator set. The stator cores are generally manufactured from thousands of laminations of relatively thin steel plates which are stacked, pressed and clamped together into the large cylindrical form of the stator core. The clamping is necessary to accommodate variations in thickness of the stock steel plate laminations, commonly referred to as crowns. Clamping is necessary to accommodate variations in thickness of the stock steel plate laminations commonly referred to as crowns. Improperly clamped laminations can result in plate vibration during generator operation, which results from magnetic impulses or core elliptical dilation.

Typically, the stator core is assembled from the steel plates directly at the final installation site. However, the large size of the stator core and the need for proper clamping results in stator core manufacturing difficulties, including generous floor space and high crane requirements. The manufacture of stator cores via the traditional methods results in manufacturing lead time and other associated manufacturing difficulties. For example, if the core is stacked directly in the stator frame, the frame must be delivered to the site before any manufacturing steps can occur. Additionally, intermediate core pressing equipment is needed to press and clamp the steel plates together at incremental lengths. If, on the other hand, the stator core is manufactured in an external fixture, the external fixture itself adds to the manufacturing costs and requires additional floor space on site and still requires the use of heavy cranes.

U.S. Pat. No. 5,875,540 by Sargeant, which is incorporated herein by reference, overcame some of the problems with the prior art by first assembling a number of laminations into a distinct set, referred to as a donut, and then stacking these donuts to form a stator core. This saved great amounts of time over assembling the laminations individually, and produced a stator core with less flaws.

When the individual laminations, or the set of laminations in a donut, are installed into a core, they engage what are referred to as keybars. Keybars are essentially rods that run the internal length of the stator core and provide a hook-in spot for the laminations. FIG. 1 illustrates a stator frame that is empty of any laminations. The keybars 6 run the internal length of the stator frame 2, and are generally attached to the frame through stator support rings 4.

The prior art requires that the laminations and donuts be stacked vertically, using gravity to guide the donuts into place. This can lead to large scale rearrangement and imposition of the stator core and surrounding area for substantial periods of time. Using the prior art stacking a core horizontally is extremely difficult with laminations, and nearly impossible with donuts due the their size and manufacturing variations. What is needed is a method and apparatus for stacking laminations and donuts horizontally.

SUMMARY OF THE INVENTION

With the foregoing in mind, methods and apparatuses consistent with the present invention facilitate the horizontal stacking of laminations and donuts to form a stator core. A stator core generator comprises a stator frame that has keybars running axially along the frame's internal diameter. Laminations are inserted within the stator frame, engaging the keybars and stacking together to form the stator core. Optionally, some laminations may be pre-stacked into bundles, referred to as donuts, before being inserted into the core. Laminations and particularly donuts are heavy and unwieldy objects. When the core is stacked vertically, gravity could be used to aid in the placement of the laminations. Attempting to stack the core horizontally, however, is extremely difficult.

The present invention provides for a central rail structure that supports laminations or donut from the top of its internal diameter. The central rail structure runs down the middle of the stator frame, and the ring shaped laminations are carried down the rail, engaging the keybars in the stator frame, to their final position. The rail structure not only aids in the placing of the laminations within the stator frame, it may further aid in the finer adjustment of the laminations when in place within the stator frame.

These and other objects, features, and advantages in accordance with the present invention are provided in one embodiment by an apparatus for the horizontal placement of laminations within a stator frame. This apparatus comprises a central rail structure that runs down approximately the center axis of the stator frame. Attached to the central rail structure are adjustable supports that hold the central rail structure within the stator frame. A dolly is positioned on top of the central rail structure, and is capable of traversing at least a portion of the length of it. The dolly also has multiple finger supports disposed on its top. The finger supports match corresponding grooves in stator core laminations, and when laminations are placed onto the dolly, gaps in the laminations engage the finger supports on the upper inner diameter of the laminations. This allows for the laminations to be horizontally moved into place within the stator frame.

In a particular embodiment the laminations are pre-stacked into a donut. The placement of the laminations or donuts may be performed at both ends of the stator frame. This allows for a stator core to be assembled from both ends, increasing the efficiency of the building process.

In another embodiment, the dolly is an adjustable unit. This allows for minor placement adjustments to be performed on the laminations. This includes side-to-side, and up-and-down adjustment. Also, having an adjustable dolly allows for the apparatus to compensate for variations in the central rail structure, such as a central dipping. Preferably, the dolly has a braking system, so that the laminations may be more easily manipulated once it is in position.

BRIEF DESCRIPTION OF THE FIGURES

The invention is explained in more detail by way of example with reference to the following drawings.

DETAILED DESCRIPTION OF THE INVENTION

The present invention comprises a method and apparatus for stacking laminations and donuts horizontally by setting up a central rail structure within the stator core frame that supports laminations and donuts by their inner diameter, allowing them to be slid into position. Stator cores tend to be stacked vertically, using gravity to guide the laminations into place. There often arises, however, a need to stack the core horizontally. For example, existing generators often need to have their cores replaced. This creates problems, since stacking individual laminations is greatly time consuming, while stacking donuts horizontally is next to impossible due to their size and manufacturing variations.

A trend in stacking the laminations has been to first compile the laminations into donuts before mounting them onto the keybars. However, when attempting to stack horizontally, the larger the aggregate sets of laminations, the more difficult they are to work with. The present invention alleviates this by providing a method and apparatus for aiding in the horizontal stacking of laminations. The present invention may be used on aggregate sets of laminations, as well as large aggregates referred to as donuts.

Figure 1:
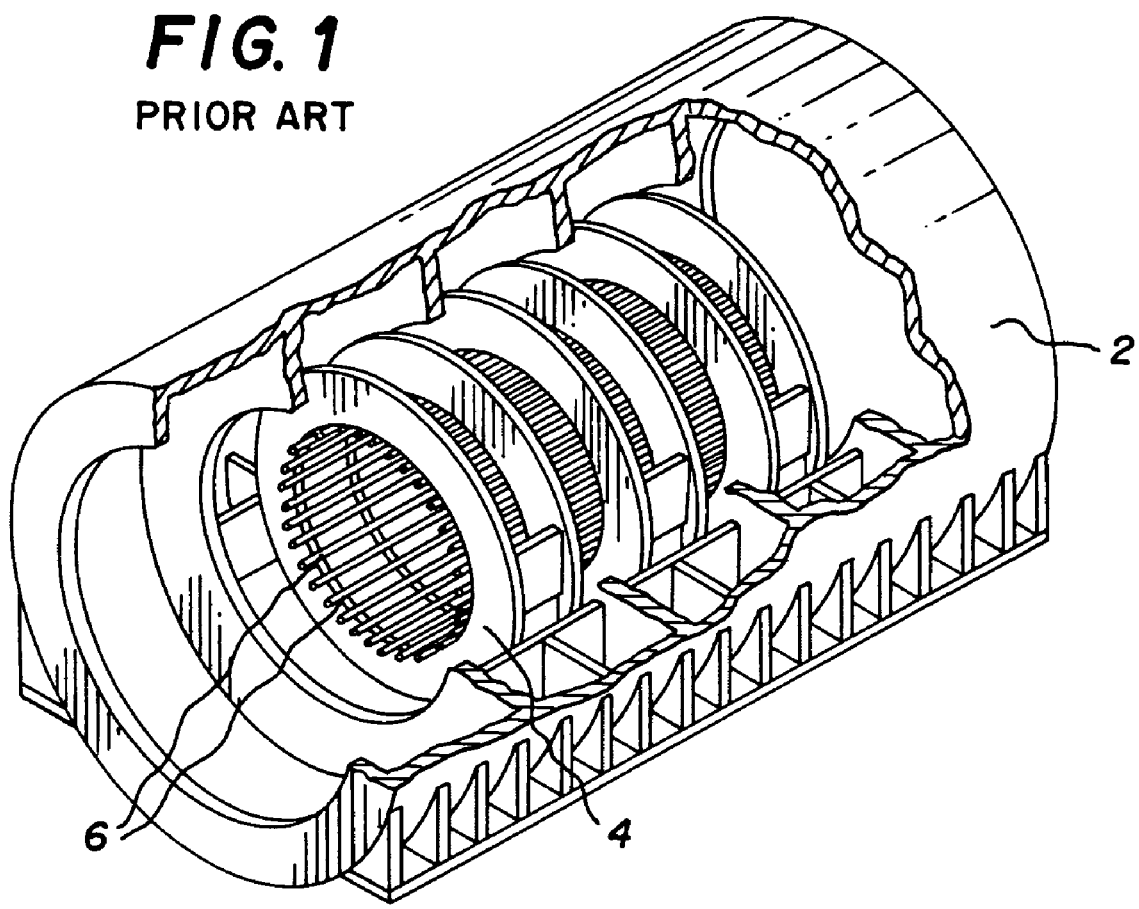
FIG. 1 illustrates a typical stator frame with keybars that has not had the stator core yet assembled.
Figure 2:
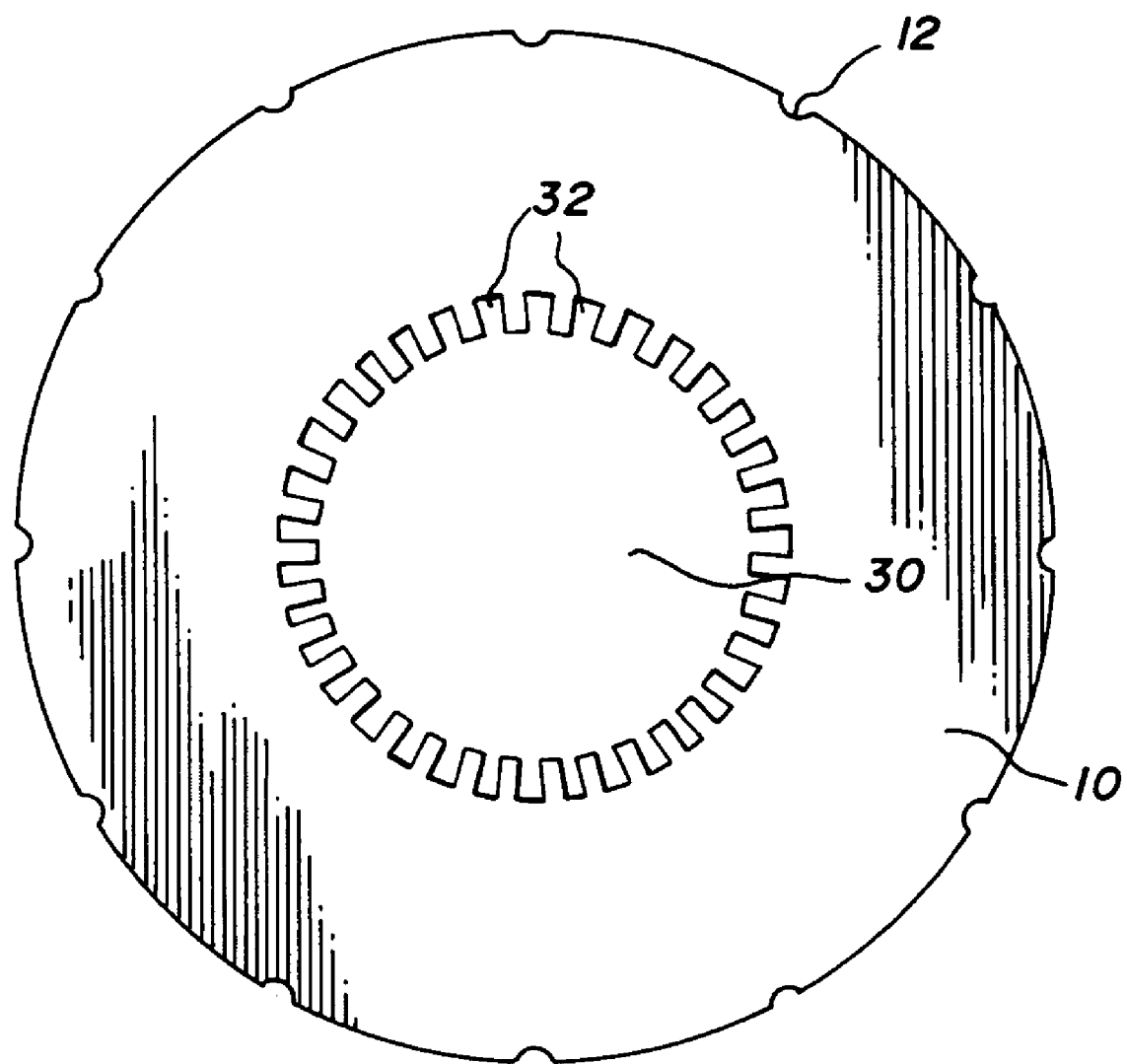
FIG. 2 illustrates an example of typical lamination aggregates used with the present invention.

A stator core generator comprises a stator frame that has keybars running axially along the frame's internal diameter. An example of a typical stator frame is shown in FIG. 1. Laminations are inserted within the stator frame 2, engaging the keybars 6 and are stacked together to form the stator core. As shown in FIG. 2, laminations 10 are can be assembled into ring-like structures that have grooves 12 along their periphery to engage keybars. As used herein the term laminations and donuts are used interchangeably to describe aggregates of laminations in partially assembled form, whether the aggregates are rod-shaped, donut shaped, ring shaped or partial assemblies of the shapes thereof. The laminations have large central holes 30 and a series of smaller finger-like gaps 32 extending radially from the central hole 30. By aligning a central rail structure to pass through this central hole, the laminations may be supported by the top of their inner diameter.

Figure 3:
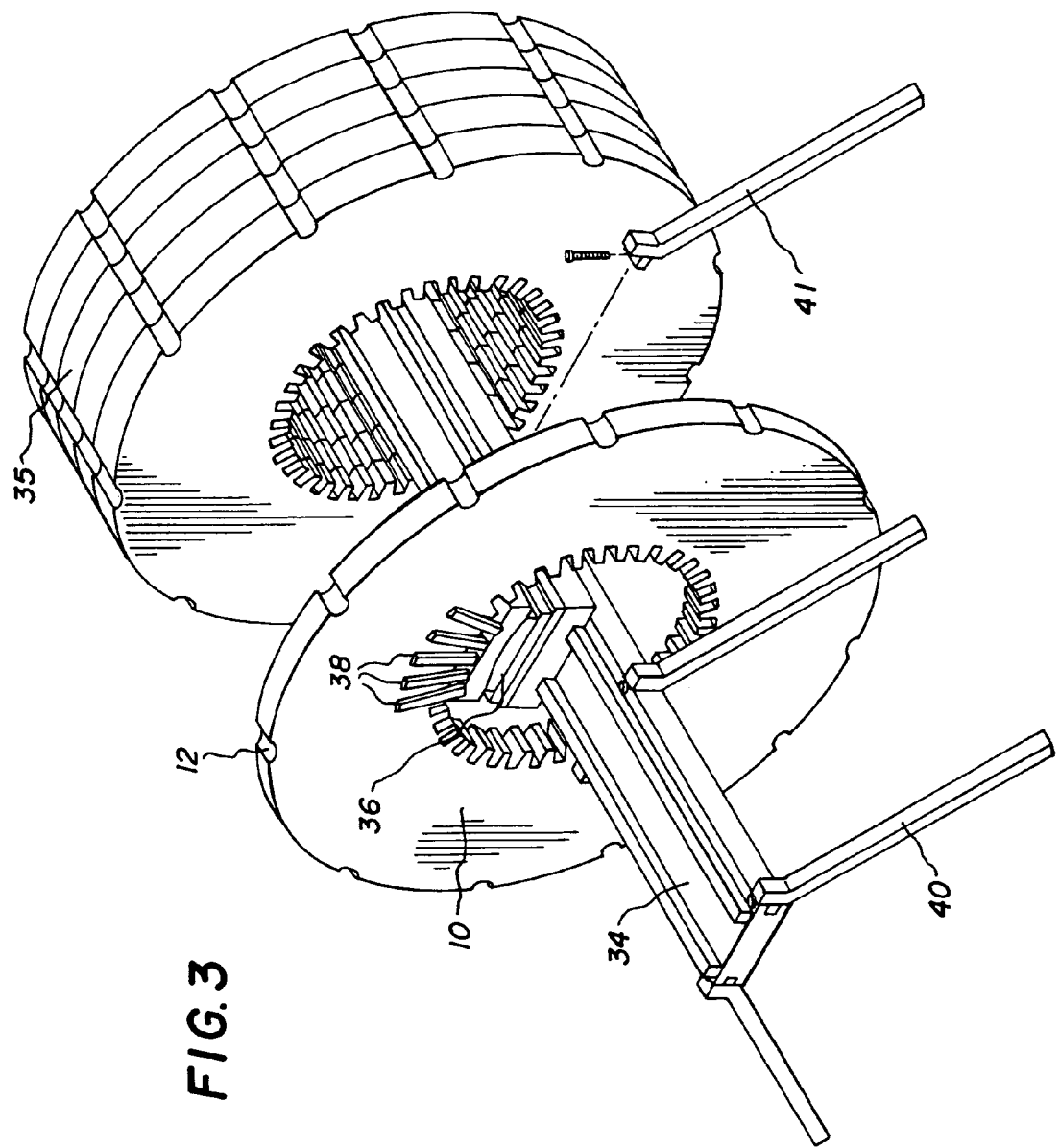
FIG. 3 illustrates a central rail structure assembling a stator core in accordance with one embodiment of the present invention.

FIG. 3 illustrates one embodiment of the central rail structure. A central rail structure 34 runs through the middle of a partially assembled stator core 35. The stator core would typically be installed within a supporting structure, referred to as a stator frame (not shown). Laminations 10 are placed onto a dolly 36 that sits atop the central rail structure 34. Finger supports 38 on the dolly engage gaps in the upper inner diameter of the laminations. The dolly carrying the laminations is then slid along the central rail structure 34 and into position within the stator frame.

The central rail structure 34 can be held in position by a variety of techniques. For example, the central rail structure may be anchored at one end by a shipping container that is used to transport laminations and donuts to the stator frame. Other techniques include, but are not limited to, cables pulleys, blocks, and support legs. FIG. 3 illustrates one example of support legs 40. The support legs 40 are placed intermittently along the central rail structure 34. In this embodiment, the support legs are braced against the floor. However, in other embodiments, the supports can use the stator frame, walls, ceiling or other structure. Since most forms of support will block the sliding of laminations 10 into position, it will usually be necessary to have adjustable supports that can either be partially or wholly removed 41 from the central rail structure 34. As the laminations are moved past points where the supports were removed, the supports can then be re-attached.

The central rail structure may be used in conjunction with other supporting mechanisms. In such embodiments, the central rail structure can be used more of a guiding mechanism than a support mechanism.

In another embodiment, the central rail support is itself mobile. This can be accomplished by a variety of techniques, such as supports that terminate in wheels, rails or similar structures. This embodiment provides two forms of lateral movement, the central rail support itself, and the dolly disposed on top to the central rail support. In a related embodiment, the dolly is fixed in relation to the central rail structure, and the central rail structure itself moves, carrying the dolly and supported laminations with it.

Figure 4:
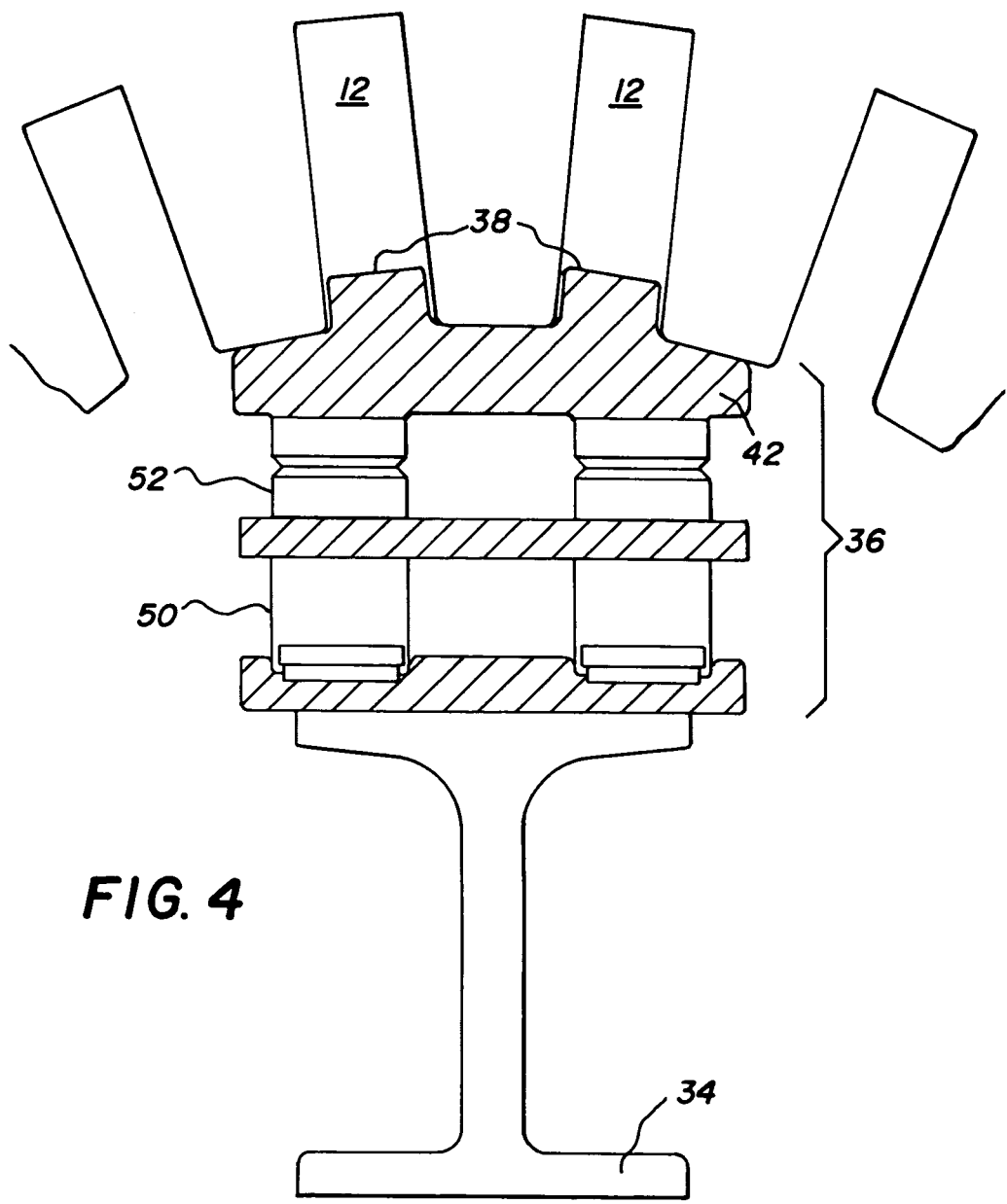
FIG. 4 illustrates a dolly supporting laminations in accordance with one embodiment of the present invention.

Referring to FIG. 4, a close-up view of one embodiment of the present invention is illustrated. A dolly 36, rests atop a central rail structure 34, supporting a lamination aggregate 10. In this embodiment, the dolly comprises two separate wheel bases 50 that hold the rest of the dolly structure. In related embodiments there may be only a single wheel base structure, or two separate wheel bases that support two independent dolly structures. The dolly 36 further comprises a saddle 42 on top of which are disposed finger supports 38 that engage grooves 12 on the upper inner diameter of the lamination 10.

In this embodiment, the dolly 36 further comprises adjustable levelers 52 that allow for additional adjustments to the laminations. These additional adjustments may move the laminations in a variety of different orientations as is necessary to properly place and align the laminations. One type of adjustment that may be necessary is to compensate for bowing in the central rail structure.

Figure 5:
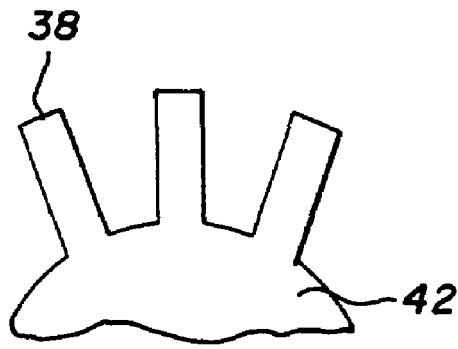
FIGS. 5-8 illustrates various embodiments of different types of finger supports.

The finger supports 38 can have a variety of different embodiments, some of which are illustrated in FIGS. 5-8. In FIG. 5, finger supports 38 are illustrated that would provide a snug fit in corresponding lamination gaps. Cushioning may also be applied to the finger supports. This may be done to increase the snugness of the fit and/or to provide greater protection to the machinery.

Figure 6:
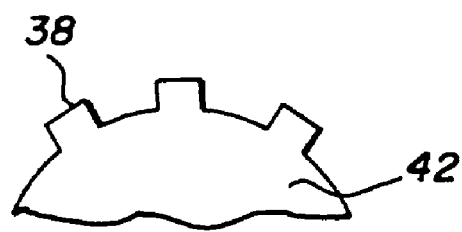
Figure 7:
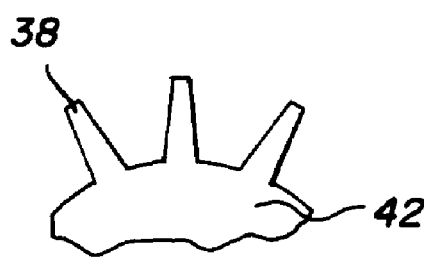
Figure 8:
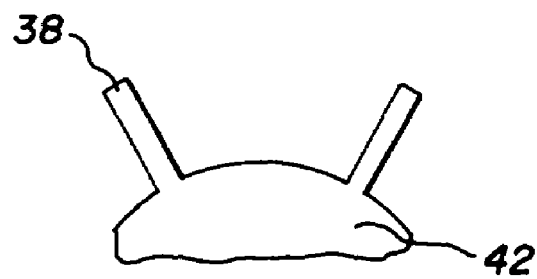

FIG. 6 illustrates shorter finger supports 38, while FIG. 7 illustrates finger supports 38 that are tapered. The tapering and shorter fingers allow for an easier overhead placement of laminations onto the dolly. FIG. 8 illustrates one example of finger supports 38 that have a wide spacing.

In some embodiment the saddle will not have any finger supports at all. The saddle may be tailored with a lip, or edge that provides alignment with a lamination, or it may be a smooth curvature that holds the lamination in place by gravity.

U.S. patent application Horizontal Assembly of Stator Core using Keybar Extensions, by Sargeant et al, provides a method and apparatus for the horizontal stacking of laminations and donuts using keybar extensions. This document is incorporated herein by reference. In one embodiment, the present invention uses multiple keybar extensions to help support a lamination(s) as it is being placed within the stator frame. In a related embodiment, the keybar extensions are used to support the central rail structure.

In one embodiment the present invention provides an apparatus for the horizontal placement of laminations within a stator frame. This apparatus comprises a central rail structure that runs down approximately the center axis of the stator frame. Attached to the central rail structure are adjustable supports that hold the central rail structure within the stator frame. A dolly is positioned on top of the central rail structure, and is capable of traversing at least a portion of the length of it. The dolly has a saddle disposed on top of it. The saddle itself is tailored to compliment the upper inner diameter of stator core laminations. Finger supports may further be placed on top of the saddle. The finger supports match corresponding grooves in stator core laminations, and when a lamination is placed onto the dolly, gaps in the lamination engage the finger supports on the upper inner diameter of the laminations. This allows for the laminations to be horizontally moved into place within the stator frame.

In a particular embodiment the laminations are multiple laminations that are pre-stacked into a donut. The placement of the laminations or donuts may be performed at both ends of the stator frame. This allows for a stator core to be assembled from both ends, increasing the efficiency of the building process.

In another particular embodiment, a second dolly is placed on the central rail structure. Depending on the need and the rail structure design, the second dolly may be placed either beside the first dolly, or in alignment with it, i.e. in front of or in back of the first dolly. When the dollies are placed side by side, they can both carry the same lamination aggregate into position. This may reduce the number of finger supports required for each dolly, and under this configuration, as little as one finger support may be provided for each dolly. When the dollies are placed in alignment with each other, they can be used to either move the same lamination into position, or they can independently position laminations. Two dollies in alignment may be used together when the lamination is thicker, such as when a donut is being positioned. When the two dollies are independently carrying laminations, they may be both operating on the same side of the stator frame, or on opposite sides.

In another embodiment, the dolly is an adjustable unit. This allows for minor placement adjustments to be performed on the laminations. This includes side-to-side, and up-and-down adjustment. Also, having an adjustable dolly allows for the apparatus to compensate for variations in the central rail structure, such as a central dipping. Preferably, the dolly has a braking system, so that the laminations may be more easily manipulated once it is in position.

In still another embodiment, cushioning is provided on the finger supports. This cushioning not only provides protection for the machinery, but also can be useful when variations in the laminations are present.

In another embodiment, the present invention provides a method for the horizontal placement of laminations within a stator frame. This method comprises installing a central rail structure substantially along the central axis of the stator frame, where the central rail structure is supported by multiple adjustable supports. Segments or parts of these adjustable supports may be adjusted or removed when it becomes necessary to pass laminations along the rail. The rail holds at least one dolly and the dolly is capable of traversing at least a portion of the length of the central rail structure. Multiple finger supports are disposed on the top of the dolly and laminations are placed onto these. The finger supports hold the laminations from the top of their inner diameter. The laminations are then slid along the rail into position within the stator frame.

The method can be used on single lamination, multiple laminations, or multiple laminations pre-stacked into donuts. The method can then be repeated as necessary until the stator core is complete.

In a particular embodiment two dollies are used on the rail side-by-side. In another embodiment, two dollies are used at opposite ends of the stator frame, and the stator core may be assembled from both ends at the same time.

The central rail structure, or rail, as used herein refers to any central support structure. The actual transport member of the structure may operate like a traditional rail system, or it may use wheels, ball bearings, magnets and other mechanisms known in the art.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the inventions which, is to be given the full breadth of the claims appended and any and all equivalents thereof.

What is claimed is:

1. An apparatus for the horizontal placement of laminations within a stator frame, comprising:
   a central rail structure that runs down approximately a center axis of said stator frame;
   adjustable supports that hold said central rail structure within said stator frame;
   a dolly that is capable of traversing at least a portion of a length of said central rail structure; and
   a saddle disposed on a top of said dolly;
   wherein said saddle is tailored to compliment an upper inner diameter of stator core laminations;
   wherein the placement of a lamination onto said dolly engages said saddle on the upper inner diameter of said lamination and allows for said lamination to be horizontally moved into place within said stator frame.

2. The apparatus of claim 1, wherein said lamination is a pre-stacked donut.

3. The apparatus of claim 1, wherein a second dolly is placed on said central rail structure.

4. The apparatus of claim 3, wherein said second dolly operates in conjunction with said dolly, such that both said dolly and said second dolly together move laminations along said central rail structure.

5. The apparatus of claim 3, wherein said second dolly operates at an opposite end of said central rail structure from said dolly, such that said dolly and said second dolly move separate laminations into said stator frame, whereby a stator core is assembled from both ends.

6. The apparatus of claim 1, wherein the placement of said laminations is performed from both ends of said stator frame.

7. The apparatus of claim 1, wherein said dolly is adjustable, whereby minor placement adjustments to said laminations are performed by adjusting said dolly.

8. The apparatus of claim 1, wherein said dolly further comprises a braking structure.

9. The apparatus of claims 1, wherein said saddle comprises finger supports disposed thereon, wherein said finger supports match corresponding grooves in the stator core laminations.

10. The apparatus of claim 9 wherein 2-5 of said finger supports are disposed on said saddle.

11. The apparatus of claim 1, wherein cushioning is provided on said finger supports.

* * * * *